United States Patent [19]

Renkl et al.

[11] 4,381,465
[45] Apr. 26, 1983

[54] STATOR ARRANGEMENT FOR SMALL MOTORS

[75] Inventors: Klaus Renkl, Kürnach; Helmut Schmidt, Reichenberg, both of Fed. Rep. of Germany

[73] Assignee: Siemens Aktiengesellschaft, Berlin and Munich, Fed. Rep. of Germany

[21] Appl. No.: 274,377

[22] Filed: Jun. 17, 1981

[30] Foreign Application Priority Data

Jun. 30, 1980 [DE] Fed. Rep. of Germany ....... 3024674

[51] Int. Cl.$^3$ ............................................. H02K 37/00
[52] U.S. Cl. ................................... 310/49 R; 310/257
[58] Field of Search ..................... 310/42, 49 R, 49 A, 310/89, 112, 257, 162–164

[56] References Cited

U.S. PATENT DOCUMENTS

| | | | |
|---|---|---|---|
| 3,504,253 | 3/1970 | Kavanaugh | 310/49 R X |
| 4,034,247 | 7/1977 | Wagensonner et al. | 310/49 R X |
| 4,174,485 | 11/1979 | Soden et al. | 310/49 R X |
| 4,309,815 | 1/1982 | Schmitt et al. | 310/42 X |
| 4,333,026 | 6/1982 | Bock et al. | 310/42 |

FOREIGN PATENT DOCUMENTS 2037993  5/1971  Fed. Rep. of Germany ........ 310/89

*Primary Examiner*—John Gonzales
*Attorney, Agent, or Firm*—Kenyon & Kenyon

[57]  ABSTRACT

A stator arrangement for a small motor, particularly of the claw-pole type. The stator arrangement is provided with first and second stator subassemblies which are formed from respective pairs of pole laminations which are contained within a common housing. The common housing is provided with axial slots having predetermined circumferential width and axial depth for engaging radial protrusions of the pole laminations. In this manner, the axial and rotative orientation of the pole laminations, and the stator subassemblies, are advantageously predetermined within the cylindrical housing.

6 Claims, 1 Drawing Figure

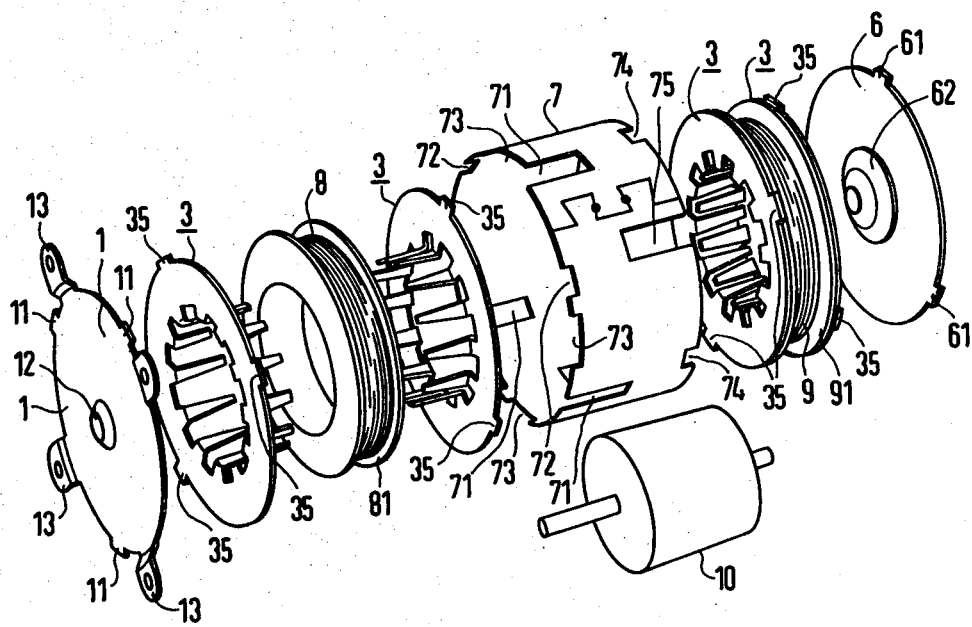

STATOR ARRANGEMENT FOR SMALL MOTORS

BACKGROUND OF THE INVENTION

This invention relates generally to stator arrangements for small motors, and more particularly, to a stator arrangement for a claw-pole stepping motor of the type wherein two stator systems are arranged axially in tandem with respect to one another in a common cylindrical housing, the cylindrical housing having slots for engaging a plurality of pole laminations with associated radial protrusions.

German Reference DE-AS No. 25 35 149 teaches a small motor having a stator which consists of two subassemblies which are welded so as to be in an axial arrangement and thereby form a motor. Each such subassembly is provided with a separate, metallic, cylindrical jacket having axial recesses which are engaged on either side thereof by radial protrusions of respective face plates. Upon assembling the two subassemblies, the mutually adjacent face rims of the cylindrical jackets are welded to one another. Such mutually adjacent face plates are held axially between the cylindrical jackets, without using addditional fastening means. This may be achieved by peening the outer face plates to their respective cylindrical jackets.

A further known system for producing stepping motors of the claw-pole type produces claw-pole laminations in the form of deep-drawn cup housings, the cup housings being pressed into one another to form pairs which are secured to one another by cementing. Two such stator systems are then combined by butt-welding, or similar procedures, to form a complete stator arrangement. The bearing plates which close off the housing on either side are welded to the outer portions of the claw-pole laminations.

It is, therefore, an object of this invention to provide a simpler and more economical system for producing claw-pole stepping motors.

SUMMARY OF THE INVENTION

The foregoing and other objects are achieved by this invention which provides a stator arrangement for a small motor, particularly a claw-pole stepping motor, wherein two stator systems are arranged axially in tandem with one another in an enclosing, cylindrical housing. The housing is provided with axial slots in its end faces, which slots are engaged by illustratively four identical pole laminations with associated radial protrusions. The stator arrangement is provided with two stator systems within one common housing having axial slots at its end faces which correspond to radial protrusions which are distributed symmetrically over the circumference of the pole laminations. The axial position of the four pole laminations with respect to one another is determined by the axial depth of the slots in the common housing. Moreover, the respective tangential orientation of the four pole laminations with respect to each other is determined by the configuration of the axial slots in the common housing, each pole lamination having a predetermined tangential orientation.

In one embodiment, the axial slots on the common housing have different widths which correspond with correspondingly formed radial protrusions which are symmetrically distributed over the circumference of the pole laminations. Each pole lamination, therefore, is provided with at least two protrusions, the axial separation between the pole laminations being determined by the depth of the respective axial slots in the common housing.

Since the inventive stator arrangement provides an integral housing for both stator subassemblies, the prior art steps of joining the two stator subassemblies, and aligning them, are avoided. Thus, the four pole laminations are simply inserted into their respective slots, which slots are simply stamped into a sheet metal blank prior to its being rolled into a housing. Thus, the laminations may be easily positioned axially, and the problem of tilting is prevented. In addition, such precut axial slots ensure that the pole laminations are arranged in a desired predetermined rotative orientation with respect to one another, which rotative orientation is selectable for predetermined directions of rotation of the motor.

As noted, the axial slots in the housing each have predetermined axial depth. Thus, the inner pole laminations are inserted into the axial slots having longer depth, and corresponding toroidal coils are inserted thereon. The outermost pole laminations are then inserted onto the shorter axial slots, and retained therein by respective bearing caps. The bearing caps are provided with radial protrusions which, in one embodiment, engage the same axial slots in the common housing in which are disposed the radial protrusions of the outermost pole laminations, the bearing caps being fastened to the housing by known means, such as by peening.

BRIEF DESCRIPTION OF THE DRAWING

Comprehension of the invention is facilitated by reading the following detailed description in conjunction with the annexed drawing which shows a perspective, exploded view of a motor constructed in accordance with the principles of the invention.

DETAILED DESCRIPTION

The FIGURE shows the essential components of a stepping motor of the claw-pole type having two stator systems in one common, cylindrical housing 7. A first stator system having pole laminations 3 and a coil 8 is assembled so that the axial protrusions (not specifically identified) of each pole lamination 3 are arranged between one another, in the manner shown by a second stator system having pole laminations 3 and a coil 9. First stator system 3, 8, 3 is inserted into common cylindrical housing 7 from the left-front face, while second stator system 3, 9, 3 is inserted into the housing from the rear-right face. A permanent magnet rotor 10 is inserted into housing 7 so as to be disposed within the first and second stator systems, the shaft of motor rotor 10 being supported in bearings 12 and 62, respectively, of a pair of bearing caps 1 and 6.

As noted, the axially protruding pole teeth of each pole lamination 3 are arranged axially inward with respect to the corresponding stator system. Thus, the pole laminations within a stator system are engaged with one another so that their respective rotative orientation is substantially fixed. In this manner, the radially inward circumference of each stator system appears as alternating poles, each pole being associated with one of the two pole laminations 3. As shown, each stator system is provided with a respective one of annular exciter coils 8 and 9, which are supported by respective coil forms 81 and 91.

Common housing 7 is provided with axial slots 71, 72, 74, and 75 on respective open end faces thereof, for engaging respective ones of radial protrusions 35 on pole laminations 3. In this manner, all of the four individual pole laminations 3, when engaged in housing 7, maintain proper axial and rotative orientation with respect to one another.

In one embodiment of the invention, improved production economy is achieved by standardizing the configurations of pole laminations 3, so that their respective radial protrusions are identical to one another. Thus, each of the pole laminations is interchangeable with any of the other pole laminations, thereby obviating the need for respective inner and outer pole laminations. In addition, the protrusions 35, which are asymmetrically distributed over the circumference of the pole laminations, are identically configured, thereby permitting axial slots 71, 72, and 74, 75, which are distributed on respective end faces of common housing 7, to be identically configured so that the mutual axial positioning of the four pole laminations is determined solely by the axial depths of the slots 71, 72, and 74, 75, respectively. As noted, the rotative positioning of the axial slots 71, 72, and 74, 75, determines the rotative positioning of the two stator subassemblies, with respect to one another.

In a further embodiment of the invention, one of the three protrusions 35 of each pole lamination may be formed so as to be wider or narrower, than the remaining protrusions, and the slots of common housing 7 may be correspondingly configured. This permits a specific positional configuration of the pole lamination within the housing. Alternatively, such specific orientation may be achieved by a predetermined symmetrical or asymmetrical distribution of the protrusions, so as to optimize the construction of the stator for a predetermined direction of rotation of the motor rotor.

In a particularly advantageous production system, common housing 7 may consist of a rolled stamping, and the axial slots 71 to 75 are stamped into the flat sheet-metal housing prior to the rolling operation. The long edges of the sheet-metal housing blank, which face each other after rolling, may either abut each other after rolling, or be connected in a form-locking dovetail configuration, as shown, which may be peened thereafter.

As shown in FIG. 1, common housing 7 is provided with deep axial slots 71 on the left face, and deep slots 75 on the right face. The corresponding three protrusions 35 of right-hand pole lamination 3 of the left stator system 3, 8, 3 are inserted into the three slots 71 until the pole lamination is seated therein so that its major plane is perpendicular to the longitudinal central axis of the motor housing. In similar manner, axial slots 72 provide guidance for positioning the protrusions from left-hand pole lamination 3 of stator system 3, 8, 3. The protrusions 35 of the left-hand pole lamination of stator system 3, 9, 3 engage the deep slots 75, and the protrusions 35 of the right-hand pole lamination of stator system 3, 9, 3, engage axial slots 74.

In one advantageous feature of the invention, short axial slots 72 and 74 also engage respective protrusions 11 and 61 on bearing caps 1 and 6. Bearing caps 1 and 6 are expediently retained by peening the portions of protrusions 11 and 61 which lie axially outward of slots 72 and 74 of housing 7. In this manner, the claw-pole motor assembly is held together.

In this embodiment, left bearing cap 1 is shown to have offset lugs 13 which project radially outward. Such lugs are engaged in corresponding axial slots 73 on the left face of common housing 7.

In some embodiments of the invention, electrical leads from coils 8 and 9 may be brought outward from common housing 7 through respective ones of the long axial slots 71 and 75.

Although the invention has been described in terms of a specific embodiment for specific applications, persons skilled in the art, in light of this teaching, can generate additional embodiments for further applications. Accordingly, it is to be understood that the drawing and descriptions in this disclosure are proffered to facilitate comprehension of the invention, and should not be construed to limit the scope thereof.

What is claimed is:

1. A stator arrangement for a motor of the type having first and second stator systems arranged axially in tandem, the arrangement further comprising:

housing means for enclosing the two stator systems, said housing means being integrally formed in a substantially cylindrical shape with first and second end faces, said first and second end faces being each provided with a plurality of axial slots; and a plurality of pole laminations for forming the first and second stator systems, each of said pole laminations being associated with one of the first and second stator systems and having a substantially circular configuration with a plurality of radial protrusions distributed at unequal angular intervals around a circumference of said circular configuration, whereby said radial protrusions of said pole laminations associated with the first and second stator systems engage respective ones of said axial slots of said first and second end faces, respectively, of said housing means, the axial and rotational orientation of said pole laminations within said housing means being determined by the axial depth and circumferential position of said axial slots, so as to provide a specific position within said housing means for each of said pole laminations.

2. The stator arrangement of claim 1 wherein said radial protrusions of said pole laminations each have equal circumferential widths to one another at portions thereof which engage said respective axial slots.

3. The stator arrangement of claim 1 wherein each of said pole laminations is provided with at least one radial protrusion having a different configuration from the remaining ones of said radial protrusions.

4. A stator arrangement for a claw-pole stepping motor of the type having first and second stator systems arranged axially in tandem within an enclosing cylindrical housing which has first and second circumferential edge portions at opposite ends thereof, the arrangement comprising:

axial slot means arranged on the enclosing cylindrical housing, said axial slot means being distributed at equal angular intervals around the first and second circumferential edge portions of the enclosing cylindrical housing, each of said axial slot means having a predetermined axial depth and a predetermined circumferential width; and plural pole lamination means, each having a substantially circular configuration, for forming the first and second stator systems, respectively, each of said pole lamination means having a plurality of radial protrusions distributed at equal angular intervals over the circumference of said circular configuration, at least one of said radial protrusions having a circumferential width which is different from the circumferential width of the remaining ones of said radial protrusions, the axial and rotative orientation of each of the first and second stator systems and their respectively associated ones of said pole lamination means within the enclosing cylindrical housing being determined by the axial depth and the circumferential distribution of said axial slot means on the respectively associated first and second circumferential edge portions of the enclosing cylindrical housing, such that each of the first and second stator systems and their respectively associated ones of said pole lamination means have a predetermined axial and rotative orientation within the enclosing cylindrical housing.

5. The stator arrangement of claim 4 wherein there are further provided first and second bearing caps for closing respective end faces formed at the first and second circumferential edge portions of the enclosing cylindrical housing, said bearing caps having radial protrusions for engaging respective ones of said axial slot means.

6. The stator arrangement of claim 4 wherein the enclosing cylindrical housing comprises a rolled stamping, said axial slot means having been stamped into said rolled stamping prior to its being rolled into the enclosing cylindrical housing.

* * * * *